US012633086B2

(12) United States Patent
Ni et al.

(10) Patent No.: US 12,633,086 B2
(45) Date of Patent: May 19, 2026

(54) METHOD, DEVICE, AND COMPUTER PROGRAM PRODUCT FOR DETECTING STICKERS

(71) Applicant: Dell Products L.P., Round Rock, TX (US)

(72) Inventors: Jiacheng Ni, Shanghai (CN); Zijia Wang, Weifang (CN); Bin He, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 708 days.

(21) Appl. No.: 18/106,134

(22) Filed: Feb. 6, 2023

(65) Prior Publication Data

US 2024/0233324 A1 Jul. 11, 2024

(30) Foreign Application Priority Data

Jan. 10, 2023 (CN) .......................... 202310031434.7

(51) Int. Cl.
| | |
|---|---|
| *G06V 10/764* | (2022.01) |
| *G06T 7/11* | (2017.01) |
| *G06T 7/13* | (2017.01) |
| *G06V 10/25* | (2022.01) |

(52) U.S. Cl.
CPC .............. *G06V 10/764* (2022.01); *G06T 7/11* (2017.01); *G06T 7/13* (2017.01); *G06V 10/25* (2022.01); *G06V 2201/07* (2022.01)

(58) Field of Classification Search
CPC .. G06V 10/25; G06V 10/764; G06V 2201/07; G06T 7/13; G06T 7/11
See application file for complete search history.

(56) References Cited

U.S. PATENT DOCUMENTS

2011/0153614 A1* 6/2011 Solomon ................ B65G 1/127
707/769
2024/0152863 A1* 5/2024 Zhang .................. G06V 30/148

OTHER PUBLICATIONS

Ting, S. L., and Albert HC Tsang. "A two-factor authentication system using radio frequency identification and watermarking technology." Computers in industry 64.3 (2013): 268-279. (Year: 2013).*

(Continued)

*Primary Examiner* — Tracy Mangialaschi
(74) *Attorney, Agent, or Firm* — Ryan, Mason & Lewis, LLP

(57) ABSTRACT

Embodiments of the present disclosure relate to a method, a device, and a computer program product for detecting stickers. The method in an illustrative embodiment includes sending, at a far edge, a sticker image of an object device to a near edge, wherein a sticker is attached to a surface of the object device, and the sticker image comprises an image of the sticker. The method further includes querying, at the far edge, label information of the object device. The method further includes receiving, at the far edge from the near edge, a classification result from classifying the sticker image. The method further includes comparing, at the far edge, the classification result with the label information. The method further includes sending, from the far edge, the sticker image to a cloud via the near edge in response to determining that the classification result is not matched with the label information.

20 Claims, 5 Drawing Sheets

(56) References Cited

OTHER PUBLICATIONS

K. Eykholt et al., "Physical Adversarial Examples for Object Detectors," Proceedings of the 12th USENIX Conference on Offensive Technologies, Aug. 2018, 10 pages.

C. Potts et al., "ParkingSticker: A Real-World Object Detection Dataset," arXiv:2001.11639v2, Feb. 12, 2020, 8 pages.

Wikipedia, "Multi-access Edge Computing," https://en.wikipedia.org/wiki/Multi-access_edge_computing, Jan. 29, 2023, 4 pages.

* cited by examiner

100A

METHOD, DEVICE, AND COMPUTER PROGRAM PRODUCT FOR DETECTING STICKERS

RELATED APPLICATION

The present application claims priority to Chinese Patent Application No. 202310031434.7, filed Jan. 10, 2023, and entitled "Method, Device, and Computer Program Product for Detecting Stickers," which is incorporated by reference herein in its entirety.

FIELD

Embodiments of the present disclosure generally relate to the technical field of object detection, and more specifically, to a method, a device, and a computer program product for detecting stickers.

BACKGROUND

Comprehensively intelligent development of the manufacturing sector puts forward new requirements for quality detection of industrial products. Surface defect detection is a key part of the quality detection of industrial products. Therefore, computer vision-based surface defect detection has widely replaced artificial vision detection. Advanced deep learning technology can significantly improve the accuracy of model recognition, but a traditional Artificial Intelligence (AI) workflow still has difficulty processing large images (e.g., generated by large manufacturing systems) in real time.

SUMMARY

Embodiments of the present disclosure provide a method, a device, and a computer program product for detecting stickers.

In an aspect of the present disclosure, a method for detecting stickers is provided. The method includes sending, at a far edge, a sticker image of an object device to a near edge, where a sticker is attached to a surface of the object device, and the sticker image comprises an image of the sticker. The method further includes querying, at the far edge, label information of the object device based on a Radio Frequency Identification (RFID) label of the object device. The method further includes receiving, at the far edge from the near edge, a classification result from classifying the sticker image. The method further includes comparing, at the far edge, the classification result with the label information. The method further includes sending, from the far edge, the sticker image to a cloud via the near edge in response to determining that the classification result is not matched with the label information.

In another aspect of the present disclosure, an electronic device is provided. The electronic device includes a processing unit and a memory, where the memory is coupled to the processing unit and has instructions stored therein. The instructions, when executed by the processing unit, cause the electronic device to execute the following actions: sending, at a far edge, a sticker image of an object device to a near edge, wherein a sticker is attached to a surface of the object device, and the sticker image comprises an image of the sticker; querying, at the far edge, label information of the object device based on an RFID label of the object device; receiving, at the far edge from the near edge, a classification result from classifying the sticker image; comparing, at the far edge, the classification result with the label information; and sending, from the far edge, the sticker image to a cloud via the near edge in response to determining that the classification result is not matched with the label information.

In still another aspect of the present disclosure, a computer program product is provided. The computer program product is tangibly stored on a non-transitory computer-readable medium and includes computer-executable instructions, wherein the computer-executable instructions, when executed by a computer, cause the computer to perform the method or process according to embodiments of the present disclosure.

This Summary is provided to introduce relevant concepts in a simplified manner, which will be further described in the Detailed Description below. The Summary is neither intended to identify key features or essential features of the present disclosure, nor intended to limit the scope of embodiments of the present disclosure.

BRIEF DESCRIPTION OF THE DRAWINGS

By description of example embodiments of the present disclosure, provided in more detail herein with reference to the accompanying drawings, the above and other objectives, features, and advantages of the present disclosure will become more apparent. In the example embodiments of the present disclosure, the same reference numerals generally represent the same elements.

DETAILED DESCRIPTION

Figure 1A:
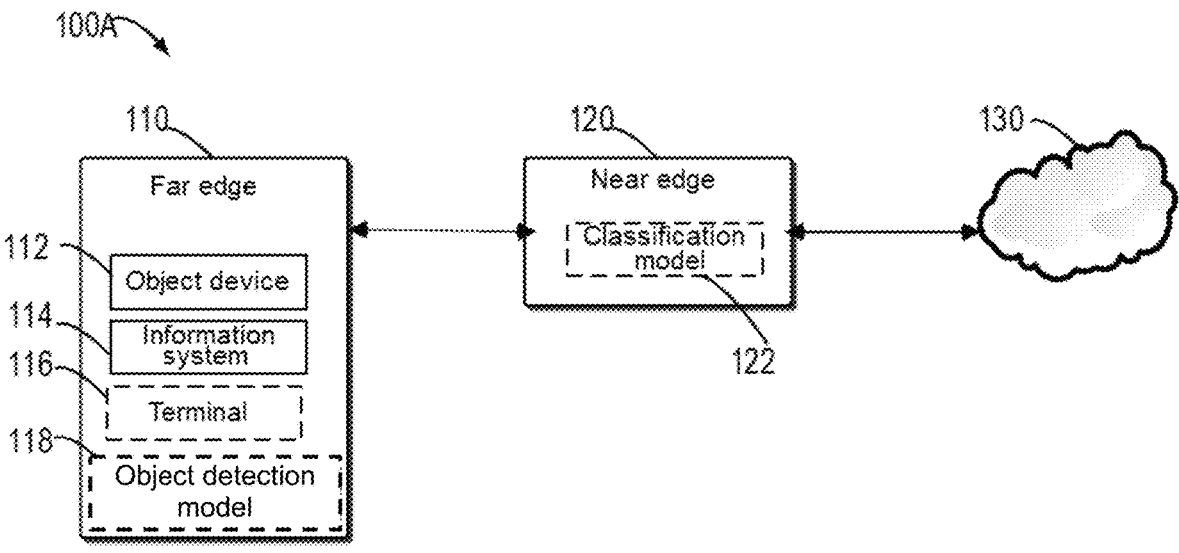
FIG. 1A is a schematic diagram of an example environment for detecting stickers according to an embodiment of the present disclosure.

Illustrative embodiments of the present disclosure will be described in more detail below with reference to the accompanying drawings. Although some embodiments of the present disclosure are shown in the accompanying drawings, it should be understood that the present disclosure may be implemented in various forms, and should not be limited to the embodiments set forth herein. Rather, these embodiments are provided to make the present disclosure more thorough and complete and to fully convey the scope of the present disclosure to those skilled in the art.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless it is clearly stated that the terms refer to different objects.

Comprehensively intelligent development of the manufacturing sector puts forward new requirements for quality detection of industrial products. Surface defect detection is a key part of the quality detection of industrial products. Therefore, computer vision-based surface defect detection has widely replaced artificial vision detection. Advanced deep learning technology can significantly improve the accuracy of model recognition, but a traditional Artificial Intelligence (AI) workflow still has difficulty processing large images (e.g., generated by large manufacturing systems) in real time. Therefore, there is a strong demand for edge AI applications in the field of intelligent manufacturing. Embodiments of the present disclosure, which may be implemented in conjunction with industrial production practices in factories and other contexts, provide advantageous solutions to find stickers attached on the surface of a device (such as a chassis) that do not match the device, and further provide an end-to-end platform workflow for edge AI instead of isolated components (such as storage devices, servers, and edge devices). Such embodiments can reduce the inspection workload of mismatched sticker detection and improve the detection efficiency of mismatched stickers.

Illustrative embodiments of the present disclosure focus on how to use artificial intelligence/machine learning (AI/ML) technologies under different computing resources (provided by a far edge-near edge-cloud hierarchical architecture) to achieve high detection accuracy, high computing efficiency, and model flexibility while reducing the manual workload of workers. Here, the need to realize model flexibility is because, for example, some new defect types will appear when new products are put into production. Therefore, in order to make a model well applicable to new products that may emerge continuously, it is necessary to ensure that the model has good flexibility in deep learning.

In the above far edge-near edge-cloud hierarchical architecture, the far edge is an edge computing infrastructure, which is deployed at a location farthest from a cloud data center and nearest to a user. For example, a far edge computing infrastructure of a mobile service provider can be located on the bottom of a mobile phone signal tower (i.e., near a mobile base station). The far edge computing infrastructure can also be deployed in shopping centers, enterprises, and factories. A Multi-access Edge Computing (MEC) infrastructure is often deployed in the far edge. Applications running at a remote end need ultra-low latency, high scalability, and high throughput. Examples of applications running in far edge illustratively include augmented reality/virtual reality (AR/VR), games, real-time video streaming applications, etc. According to collocated applications, the far edge computing infrastructure is called different names. For example, when the far edge collocates enterprise applications such as Software Defined Wide Area Network (SD-WAN) services, it can be called an enterprise edge, and when it collocates Internet of Things applications such as Internet of Things gateway functions, it can be called an Internet of Things edge.

The near edge is also an edge computing infrastructure, which is deployed at a location between the far edge and the cloud data center. That is, compared with the far edge, the near edge is closer to the cloud data center. The far edge computing infrastructure collocates applications specific to its deployed locations while the near edge computing infrastructure collocates common services. The near edge computing infrastructure can be, for example, a Content Delivery Network (CDN) cache, a fog computing infrastructure, and the like. The Central Office (CO) of a telecom service provider can be used as the near edge or far edge computing infrastructure.

Regarding how to select locations of edges of running applications (that is, whether to put the edges of the running applications on the far edge or near edge), for example, scalability (number of users, number of devices, etc.), application types (games, video streams, network content, social media, etc.), latency requirements of the applications, throughput requirements of the applications, entities managing applications (enterprises, telecom companies, cloud service providers, etc.), security restrictions, and the like can be considered.

Specifically, embodiments of the present disclosure provide a method of combining a decoupled deep learning model (object detection model, classification model, etc.) by means of the far edge-near edge-cloud hierarchical architecture to provide an overall solution to solve the problem of product surface defect detection (sticker mismatch detection) in a factory. The method illustratively includes data collection, far edge object extraction, near edge classification, retraining a model at the cloud end, deploying the retrained model to the far edge and the near edge, and other steps. In this way, the far edge-near edge-cloud hierarchical architecture can balance the workload of deep learning model training and reasoning, realize calculation unloading, achieve flexibility for new defect types, and share relatively large workload by means of automatic processing, thus significantly reducing manual workload.

Basic principles and several example embodiments of the present disclosure will be illustrated below with reference to FIGS. 1A to 5. It should be understood that these example embodiments are given only to enable those skilled in the art to better understand and thus implement embodiments of the present disclosure, and are not intended to limit the scope of the present disclosure in any way.

FIG. 1A is a schematic diagram of example environment 100A for detecting stickers according to an embodiment of the present disclosure. As shown in FIG. 1A, in example environment 100A, far edge 110, near edge 120, and cloud 130 may be included. Far edge 110, for example, can be set locally in a factory, near edge 120, for example, can be set between far edge 110 and cloud 130, wireless communication, for example, can be conducted between far edge 110 and near edge 120, and wired communication, for example, can be conducted between near edge 120 and cloud 130.

In some embodiments, in example environment 100A, there is object device 112 with defects on a to-be-detected surface at far edge 110. Also, information system 114 and terminal 116 can be deployed. The terminal may include, for example, a sensor (such as a Radio Frequency Identification (RFID) sensor) and/or a camera. Object device 112 may be a chassis of various devices (for example, storage apparatuses, personal computers, mobile phones, lighting equipment, fans, vehicle parts, WIFI equipment, and any other devices with relevant stickers attached to their surfaces). For example, object device 112 may be a chassis produced by a factory (such as a computer chassis and an object device chassis), and stickers and RFID labels are attached on a surface of object device 112. Examples of stickers include operating system (OS) stickers, central processing unit (CPU) stickers, and the like. Information system 114 may be, for example, a manufacturing information system, which stores label information of object device 112. The sensor included in terminal 116 may enter, by reading the RFID labels, information system 114 to obtain the label information of object device 112.

In some embodiments, in example environment 100A, the camera included in terminal 116 can obtain (capture) a surface image of object device 112, and the surface image includes an image of a sticker attached on its surface. In order to avoid missing shots of stickers attached to the surface, the surface image in some embodiments captures the entire surface of object device 112. On the other hand, because stickers usually occupy only a small part of the entire surface, if the surface image is directly used as a processing object for next-step processing, it will increase the unnecessary calculation amount, etc. Therefore, in some embodiments, object detection model 118 is deployed in far edge 110. Specifically, object detection model 118 may be deployed in terminal 116. Terminal 116 may extract, from the surface image of object device 112 by means of object detection model 118, a region of interest (ROI), i.e., a sticker region, to obtain an image of a sticker (which is referred to as "a sticker image" below).

In some embodiments, for performing highly efficient deep learning and reasoning, there may be multiple (for example, more than 10 or more) regions of interest (ROIs) on the surface of object device 112, and each ROI has multiple (for example, more than 10 or more) types for classification.

In some embodiments, far edge 110 may send the sticker image to near edge 120. Classification model 122 is deployed at near edge 120. Near edge 120 then classifies the sticker image by means of classification model 122 to obtain a classification result. For example, object device 112 may be a CPU chassis. At this time, for a CPU sticker, near edge 120 may use classification model 122 to obtain a particular CPU configuration of object device 112 as the classification result and send the classification result back to far edge 110. Then, far edge 110 may compare the classification result with label information of object device 112 obtained by terminal 116 by means of reading an RFID label. If far edge 110 determines that the classification result is not matched with the label information, far edge 110 may send the sticker image to cloud 130 via near edge 120. Then, cloud 130 may use the sticker image to perform incremental retraining on object detection model 118 and classification model 122 until the object detection model and the classification model can obtain accurate automatic detection results with a high degree of confidence for these mismatched sticker images. Then, cloud 130 can deploy retrained object detection model 118 to far edge 110 and deploy retrained classification model 122 to near edge 120 for subsequent automatic detection of other sticker images.

Figure 1B:
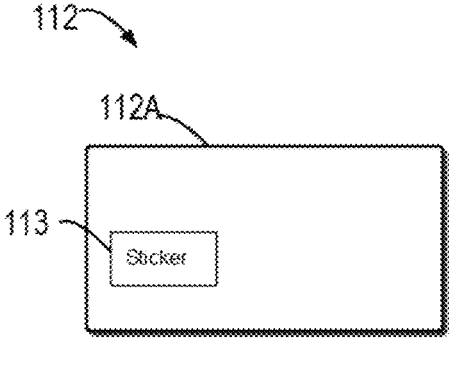
FIG. 1B is a schematic diagram illustrating a sticker attached on a surface of an object device according to an embodiment of the present disclosure.

FIG. 1B is a schematic diagram of object device 112 having a sticker 113 attached on a surface 112A according to an embodiment of the present disclosure. FIG. 1B is illustrated with reference to FIG. 1A. As shown in FIG. 1B, sticker 113 is attached to surface 112A of object device 112. Terminal 116 shown in FIG. 1A can capture an image of surface 112A of object device 112 and then extract an image of a region corresponding to sticker 113, i.e., a sticker image, for subsequent processing.

Figure 2A:
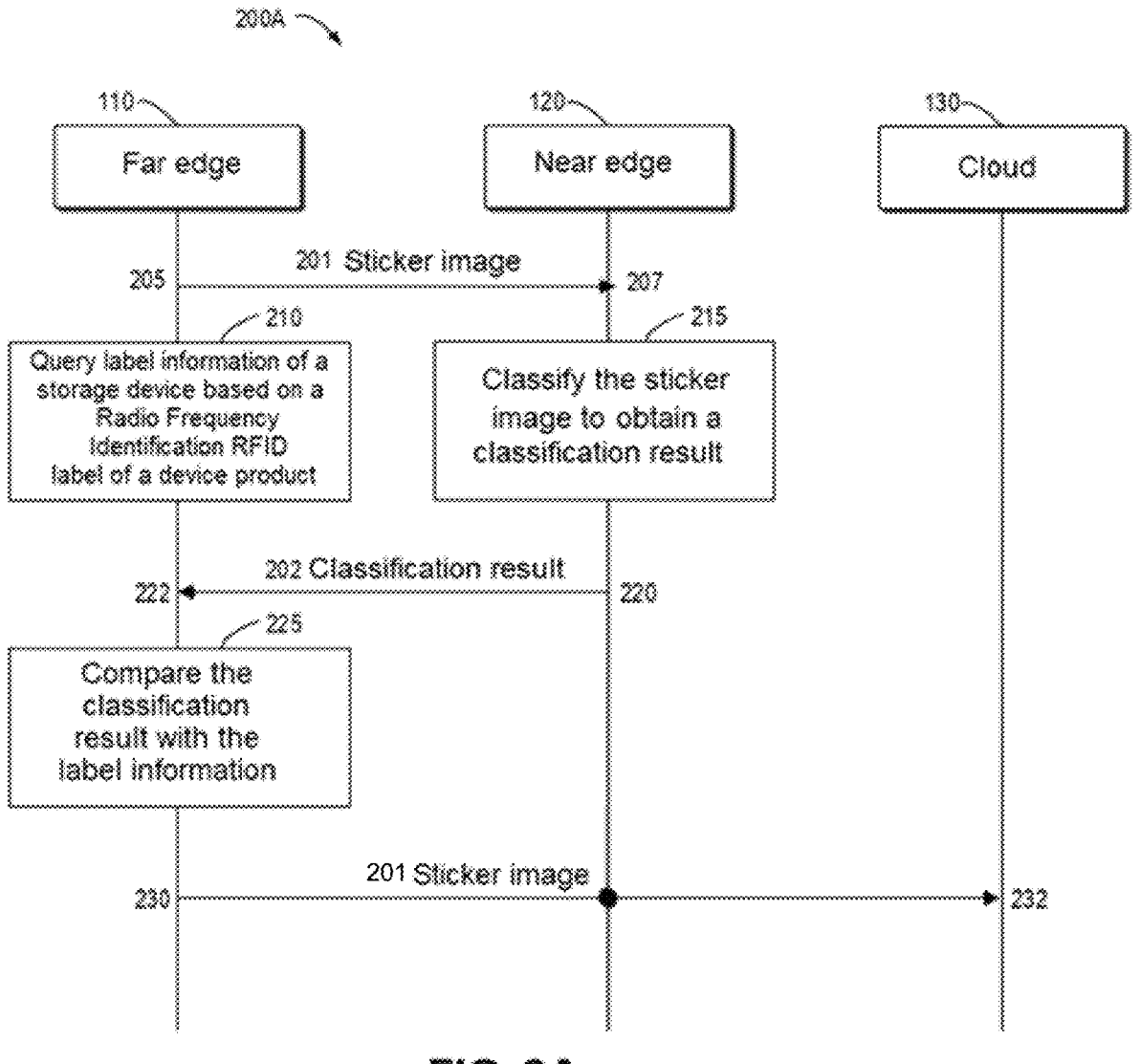
FIG. 2A is a flowchart of a method for detecting stickers according to an embodiment of the present disclosure.

FIG. 2A is a flowchart of example method 200A for detecting stickers according to an embodiment of the present disclosure. Example method 200A is illustrated with reference to FIG. 1A and FIG. 1B.

As shown in FIG. 2A, in example method 200A, sticker image 201 of object device 112 is sent (205), at far edge 110, to near edge 120. A sticker is attached to a surface of object device 112, and the sticker image comprises an image of the sticker. At the other communication side, at near edge 120, sticker image 201 is received (207) from far edge 110.

In 210, label information of object device 112 is queried at far edge 110 based on an RFID label of object device 112. In 215, sticker image 201 is classified at near edge 120 to obtain classification result 202. Then, classification result 202 is sent (220) at near edge 120 to far edge 110. At the other communication side, classification result 202 is received (222) at far edge 110 from near edge 120.

In 225, classification result 202 is compared with the label information at far edge 110. If it is determined in 225 that classification result 202 is not matched with the label information, sticker image 201 is sent (230) from far edge 110 to cloud 130 via near edge 120. At the other communication side, cloud 130 receives (232) sticker image 201 from far edge 110 via near edge 120.

As stated above, object device 112 may be a chassis of various devices (for example, storage apparatuses, personal computers, mobile phones, lighting equipment, fans, vehicle parts, WIFI equipment, and any other devices with relevant stickers attached to their surfaces). In a case where object device 112 is a CPU chassis, the sticker attached on the surface of object device 112 should be a CPU sticker. If an incorrect sticker is attached, for example, an OS sticker is attached by mistake, classification result 202 received by far edge 110 from near edge 120 will display that the sticker is classified as "OS configuration" such as an OS version. In 210, label information of object device 112 obtained at far edge 110 by querying based on the RFID label of object device 112 will display "OS configuration" information, such as the OS version, of object device 112. Therefore, in 225, when the classification result is compared with the label information at far edge 110, it may be found that they are mismatched. Therefore, in response to that the classification result is mismatched with the label information, sticker image 201 is sent (230) from far edge 110 to cloud 130 via near edge 120, such that, for example, cloud 130 uses sticker image 201 to perform incremental retraining on object detection model 118 and classification model 122, which will be illustrated later with reference to FIG. 2B and is not repeated herein.

In some embodiments, a process of sending (230) sticker image 201 from far edge 110 to cloud 130 via near edge 120 may include that on the basis that sticker image 201 has been sent (205) from far edge 110 to near edge 120, therefore, far edge 110 may send indication information to near edge 120. The indication information is used to instruct near edge 120 to forward sticker image 201 to cloud 130. Specifically, for example, near edge 120 may store locally sticker image 201 sent to it to obtain a classification result for a period of time, and the period of time can be, for example, one hour or one day. If in the period of time, far edge 110 wants to send (230) sticker image 201 to cloud 130 via near edge 120, it can send the above sending instruction instead of sending sticker image 201 itself. In this way, since a data payload of a sending instruction is smaller than that of sending sticker image 201, it can further reduce the data traffic from far edge 110 to near edge 120, reduce network overhead and time delay, and improve processing efficiency. It should be noted that in this example, if far edge 110 sends (230) sticker image 201 to cloud 130 via near edge 120 outside the time period (that is, after the time period), since near edge 120 does not store sticker image 201 locally (that is, in near edge 120 locally, sticker image 201 has been removed), far edge 110 needs to send (230) sticker image 201 itself to cloud 130 via near edge 120.

Figure 2B:
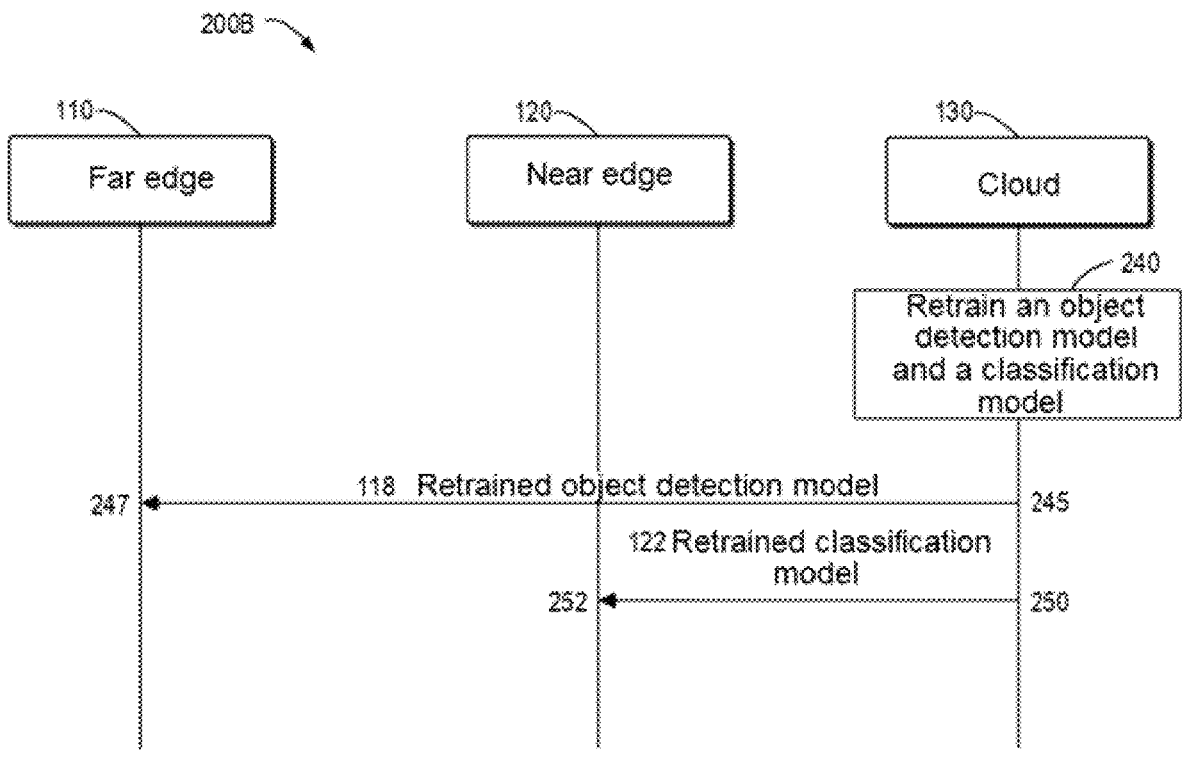
FIG. 2B is a flowchart of retraining a model according to an embodiment of the present disclosure.

FIG. 2B is a flowchart of method 200B for retraining a model according to an embodiment of the present disclosure. FIG. 2B is illustrated with reference to FIG. 1A, FIG. 1B, and FIG. 2A.

Method 200B can be executed after method 200A shown in FIG. 2A. For example, in the embodiment shown in FIG. 2A, in response to determining that classification result 202 is not matched with label information, sticker image 201 is sent (230) from far edge 110 to cloud 130 via near edge 120. Therefore, cloud 130 can use sticker image 201 to retrain (240) object detection model 118 and classification model 122 (for example, cloud 130 can use sticker image 201 to perform incremental retraining on object detection model 118 and classification model 122) until object detection model 118 and classification model 122 can obtain accurate automatic detection results with a high degree of confidence for sticker image 201. Then, cloud 130 can send/deploy (245) retrained object detection model 118 to far edge 110 and send/deploy (250) retrained classification model 122 to near edge 120. At the other communication side, far edge 110 receives (247) retrained object detection model 118 from cloud 130, and near edge 120 receives (252) retrained classification model 122 from cloud 130. Then, far edge 110 uses retrained object detection model 118 to extract a sticker image from a surface image of object device 112, and near edge 120 uses retrained classification model 122 to classify the sticker image.

Figure 3:
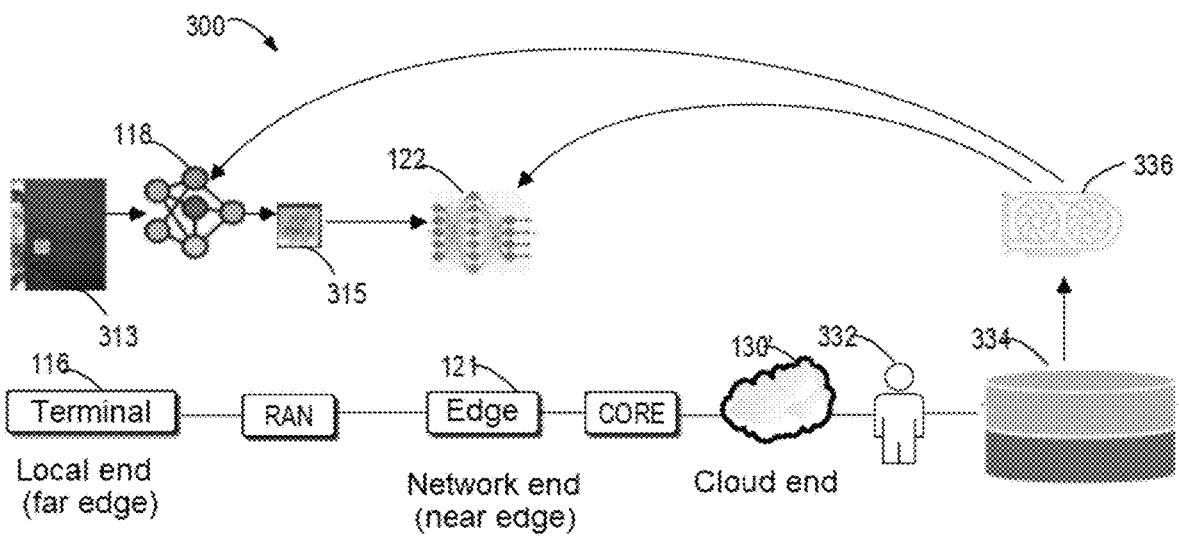
FIG. 3 is a schematic diagram of an architecture of a detection system for detecting stickers according to an embodiment of the present disclosure.

FIG. 3 is a schematic diagram of an architecture of example detection system 300 for detecting stickers according to an embodiment of the present disclosure. FIG. 3 is illustrated with reference to FIG. 1A, FIG. 1B, FIG. 2A, and FIG. 2B. Example detection system 300 shows a local end (on-premises edge), a network end (a network edge), and a cloud end (cloud) 130', which respectively correspond to far edge 110, near edge 120, and cloud 130 shown in FIG. 1A. In other words, the local end shown in FIG. 3 (for example, a factory) is an example of far edge 110, the network end shown in FIG. 3 is an example of near edge 120, and the cloud end shown in FIG. 3 is an example of cloud 130. As shown in FIG. 3, in example detection system 300, the local end is connected to the network end via a radio access network (RAN). The network end is connected to the cloud end via a core network.

A terminal (for example, equivalent to terminal 116 shown in FIG. 1A) is configured on the local end for collecting data. Terminal 116 may comprise customized hardware, for example, as stated above, may include a sensor and a camera. By means of the sensor, for example, in terminal 116, an RFID label (a product ID, which is prestored in an information system (for example, information system 114 shown in FIG. 1A, which, for example, may be a manufacturing information system)) attached on a surface of an object device (for example, object device 112 shown in FIG. 1A and FIG. 1B) can be read, and the information system can be accessed to obtain label information related to the object device, such as an OS version, CPU configuration, and the like. By means of the camera, for example, in terminal 116, surface image 313 of the object device (for example, a chassis such as a computer chassis or a chassis of a storage apparatus) can be obtained. Surface image 313 may include one or more surface images of one surface, and may include surface images captured for multiple surfaces, where one or more surface images can be captured for each surface.

As stated above, an object detection model is configured at the far edge (equivalent to the local end in the embodiment shown in FIG. 3) for model reasoning. In some embodiments, over 10000 marked images are used to train object detection model 118. Object detection model 118 performs object detection on surface image 313 and extracts a region of interest (ROI) so as to obtain an image of a sticker (for example, an OS sticker, a CPU sticker, and the like) attached on a surface of the object device, and the image is called sticker image 315 for short. Sticker image 315 is equivalent to sticker image 201 shown in the embodiment of FIG. 2A. Trained object detection model 118 shows better performance in terms of accuracy and efficiency. In addition, during object detection, trained object detection model 118 can be converted into TensorRT for reasoning acceleration.

In this way, extracted sticker image 315 is obtained from the surface image by means of an object detection model. Then, sticker image 315 is sent from the local end to edge device 121 at the network end.

At the other communication side, edge device 121 at the network end receives sticker image 315 from the local end. Classification model 122 is deployed at the network end for model reasoning. The network end then uses classification model 122 to classify sticker image 315 to obtain a classification result.

In this embodiment, in order to improve flexibility of a detection system, a recognition task performed by classification model 122 is separated from a task of extracting an ROI by means of object detection model 118; specifically, as stated above, object detection model 118 is deployed at the far edge (the local end as shown in the embodiment of FIG. 3) for extracting an ROI (such as an OS sticker, a CPU sticker, and the like) from surface image 313, and classification model 122 is deployed at the near edge (the network end as shown in the embodiment of FIG. 3) for classifying (recognizing) sticker image 315. In this way, if some new CPU configurations appear, it is unnecessary to update object detection model 118 located at the far edge, but only classification model 122 at the near edge needs to be updated, and then the flexibility of the detection system can be improved.

As stated above, sticker image 315 obtained by means of extracting the ROI is classified at the network end by means of classification model 122 (such as a classifier) to obtain a classification result of sticker image 315. In this step, only a "general" object is detected such as an operating system sticker, a CPU sticker, or other sticker types. In some embodiments, there may be too many sticker types, such that some stickers cannot be processed by classification model 122 but are processed by optical character recognition (OCR). One of the reasons why classification model 122 is arranged at the near edge not the far edge is that consumption of computing resources by large models will increase the cost of the far edge.

Returning to the embodiment shown in FIG. 3, classification model 122, as stated above, can classify received sticker image 315 to obtain further specific information so as to achieve the aim of classifying sticker image 315. Specifically, for example, in a case where sticker image 315 is an image of an OS sticker, classification model 122 is used to classify sticker image 315 to further obtain an OS version; in a case where sticker image 315 is an image of a CPU sticker, classification model 122 is used to classify sticker image 315 to further obtain the CPU configuration. These obtained further particular information (such as the above-described OS version, the CPU configuration, and the like) can be used as a classification result (such as classification result 202 shown in the embodiment of FIG. 2). Compared with original surface image 313, sticker image 315 is much smaller; therefore, performing object detection on surface image 313 at the local end to obtain relatively smaller sticker image 315 and then sending sticker image 315 to the network end can greatly reduce the communication data amount from the local end to the network end, thus reducing the processing delay and improving the processing efficiency.

The classification result obtained at the network end is transmitted back to the local end, and then the local end can compare the classification result with label information of object device 112 obtained from an information system (such as information system 114 shown in FIG. 1A). Regarding the comparison result, if the classification result is matched with the label information of object device 112 obtained from the information system and has a high degree of confidence (for example, greater than a first threshold, which, for example, can be 95%), the local end determines that the sticker is not wrongly attached but is instead correctly attached, and the detection of the sticker of object device 112 ends. If the classification result is not matched with the label information obtained from the information system or has a low degree of confidence (for example, lower than a second threshold, which, for example, can be 80%) although they are matched, the local end can report the mismatch of the sticker to a (assembly line) user (or administrator) 332 via the network end. User 332 will conduct a manual check to confirm whether the sticker is attached incorrectly and correct it manually if it is attached incorrectly. The local end can also send sticker image 315 to cloud end 130' (equivalent to cloud 130 shown in FIG. 1A) for further processing in database 334 of cloud end 130'.

As stated above, at cloud end 130', mismatched sticker image 315 uploaded from the local end via the network end or sticker image 315 that is matched but has a low degree of confidence is received. User 332 can then manually confirm whether these stickers are attached wrongly, and correct a sticker boundary box and a sticker type that are incorrectly marked. For example, user 332 can check the image uploaded from the near edge with a low degree of reasoning confidence, and refine the stickers of original data (including the sticker boundary box and the sticker type). Moreover, workers can mark these bad cases and store them in database 334 of cloud 130', and then use these bad cases to retrain (336) object detection model 118 and classification model 122 on newly marked instances, until object detection model 118 and classification model 122 can obtain accurate automatic detection results with a high degree of confidence for these bad cases. That is, an AI/ML model will perform incremental retraining on the re-labeled data to improve accuracy. This cycle represents active learning. Then, cloud end 130' can deploy retrained object detection model 118 to the local end and deploy retrained classification model 122 to the network end for subsequent automatic detection of other sticker images.

Figure 4:
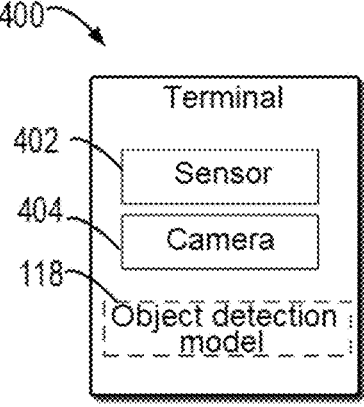
FIG. 4 is a schematic diagram of hardware used by a detection system for detecting stickers according to an embodiment of the present disclosure.

FIG. 4 is a schematic diagram of terminal 400 used by a detection system for detecting stickers according to an embodiment of the present disclosure. Terminal 400 includes terminal 116 shown in FIG. 1A. As shown in FIG. 4, Terminal 400 includes sensor (such as an RFID sensor) 402 and camera 404 which may include multiple pick-up heads. By means of RFID sensor 402, an RFID label (product ID, which is prestored in an information system) attached on a surface of an object device (for example, object device 112 shown in FIG. 1A and FIG. 1B) can be read, and the information system can be accessed to obtain label information related to the object device, for example, an OS version, a CPU configuration, and the like. As stated above, a surface image of an object device (such as a chassis) can be obtained by means of the camera. As shown in FIG. 4, object detection model 118 can also be deployed in terminal 400. Specifically, object detection model 118 can also be deployed in camera 404 of terminal 400. Therefore, when camera 404 captures an image of the surface (for example, surface 112A shown in FIG. 1B) of object device 112, a sticker image of a sticker (for example, sticker 113 shown in FIG. 1B) attached on surface 112A can be extracted from the surface image locally by means of object detection model 118. In this way, it is not necessary to send the surface image to a part other than camera 404 to extract the sticker image from the surface image. The sticker image can be directly extracted locally, thus reducing the amount of data transmitted, lowering the network load and time delay, and improving the processing efficiency of the detection system.

Figure 5:
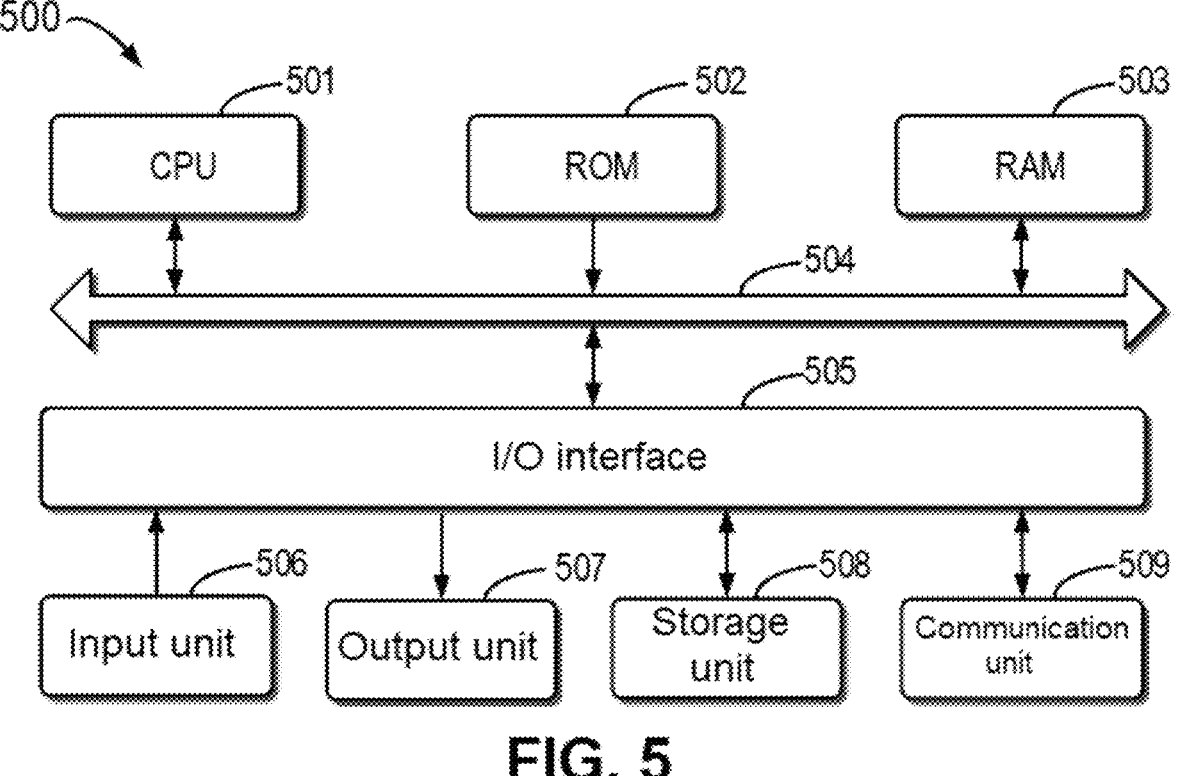
FIG. 5 is a block diagram of a device that can be used to implement embodiments according to the present disclosure.

FIG. 5 is a block diagram of device 500 that can be used for implementing embodiments of the present disclosure. Device 500 may be a device or an apparatus described in embodiments of the present disclosure. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various methods or processes described above may be executed by CPU 501. For example, in some embodiments, the method may be implemented as a computer software program that is tangibly included in a machine-readable medium, such as storage unit 508. In some embodiments, part of or all the computer program may be loaded and/or installed to device 500 via ROM 502 and/or communication unit 509. When the computer program is loaded into RAM 503 and executed by CPU 501, one or more steps or actions of the method or process described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flowcharts and/or block diagrams.

The computer-readable program instructions can also be loaded onto a computer, other programmable data processing apparatuses, or other devices, so that a series of operating steps are performed on the computer, other programmable data processing apparatuses, or other devices to produce a computer-implemented process. Therefore, the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functions, and operations of possible implementations of the device, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions denoted in the blocks may also occur in a sequence different from that shown in the figures. For example, two consecutive blocks may in fact be executed substantially concurrently, and sometimes they may also be executed in a reverse order, depending on the functions involved. It should be further noted that each block in the block diagrams and/or flowcharts as well as a combination of blocks in the block diagrams and/or flowcharts may be implemented by a dedicated hardware-based system executing specified functions or actions, or by a combination of dedicated hardware and computer instructions.

Illustrative embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method, comprising:

sending, at a far edge, a sticker image of an object device to a near edge, wherein a sticker is attached to a surface of the object device, and the sticker image comprises an image of the sticker, wherein the sticker image is obtained at the far edge by utilizing a first machine learning model, deployed to the far edge from a cloud, to process one or more object images captured at the far edge, wherein at least one of the object images includes at least a portion of the sticker image, the near edge comprising at least one edge device that is arranged between a terminal device of the far edge and the cloud;

querying, at the far edge, label information of the object device based on a Radio Frequency Identification (RFID) label of the object device;

receiving, at the far edge from the near edge, a classification result from classifying the sticker image, wherein the classification result is obtained at the near edge by utilizing a second machine learning model, deployed to the near edge from the cloud, the second machine learning model being different than the first machine learning model;

comparing, at the far edge, the classification result with the label information; and sending, from the far edge, the sticker image to the cloud via the edge device of the near edge in response to determining that the classification result is not matched with the label information.

2. The method according to claim 1, wherein sending, at the far edge, the sticker image of the object device to the near edge comprises:

capturing a surface image of the object device at the far edge; and processing at least a portion of the surface image at the far edge to obtain the sticker image and sending the sticker image to the near edge.

3. The method according to claim 2, wherein processing at least a portion of the surface image at the far edge to obtain the sticker image comprises:

extracting, at the far edge, the sticker image from the surface image by means of an object detection model.

4. The method according to claim 3, wherein the object detection model extracts the sticker image from the surface image based on a region of interest (ROI).

5. The method according to claim 1, wherein querying the label information of the object device comprises:

querying, at the far edge, the label information from a manufacturing information system based on the RFID label.

6. The method according to claim 1, wherein the classification result is obtained by running a classification model at the near edge.

7. The method according to claim 6, wherein optical character recognition (OCR) is used by the classification model.

8. The method according to claim 1, wherein the sticker image sent to the cloud is further checked.

9. The method according to claim 1, wherein:

the sticker image is used by the cloud to retrain an object detection model and a classification model; and the retrained object detection model is deployed by the cloud to the far edge, and the retrained classification model is deployed by the cloud to the near edge.

10. The method according to claim 9, further comprising:

receiving, by the far edge, the retrained object detection model from the cloud; and processing, by the far edge, another sticker image by means of the retrained object detection model.

11. The method according to claim 1, wherein the sticker comprises a central processing unit (CPU) sticker, and the label information comprises a CPU configuration.

12. The method according to claim 1, wherein the sticker comprises an operating system (OS) sticker, and the label information comprises an OS version.

13. An electronic device, comprising:

at least one processing unit; and memory coupled to the at least one processing unit and storing instructions, wherein the instructions, when executed by the at least one processing unit, cause the electronic device to execute actions comprising:

sending, at a far edge, a sticker image of an object device to a near edge, wherein a sticker is attached to a surface of the object device, and the sticker image comprises an image of the sticker, wherein the sticker image is obtained at the far edge by utilizing a first machine learning model, deployed to the far edge from a cloud, to process one or more object images captured at the far edge, wherein at least one of the object images includes at least a portion of the sticker image, the near edge comprising at least one edge device that is arranged between a terminal device of the far edge and the cloud;

querying, at the far edge, label information of the object device based on a Radio Frequency Identification (RFID) label of the object device;

receiving, at the far edge from the near edge, a classification result from classifying the sticker image, wherein the classification result is obtained at the near edge by utilizing a second machine learning model, deployed to the near edge from the cloud, the second machine learning model being different than the first machine learning model;

comparing, at the far edge, the classification result with the label information; and sending, from the far edge, the sticker image to the cloud via the edge device of the near edge in response to determining that the classification result is not matched with the label information.

14. The electronic device according to claim 13, wherein sending, at the far edge, the sticker image of the object device to the near edge comprises:

capturing a surface image of the object device at the far edge; and processing at least a portion of the surface image at the far edge to obtain the sticker image and sending the sticker image to the near edge.

15. The electronic device according to claim 14, wherein processing at least a portion of the surface image at the far edge to obtain the sticker image comprises:

extracting, at the far edge, the sticker image from the surface image by means of an object detection model.

16. The electronic device according to claim 15, wherein the object detection model extracts the sticker image from the surface image based on a region of interest (ROI).

17. The electronic device according to claim 13, wherein querying the label information of the object device comprises:

querying, at the far edge, the label information from a manufacturing information system based on the RFID label.

18. The electronic device according to claim 13, wherein the classification result is obtained by running a classification model at the near edge.

19. The electronic device according to claim 18, wherein optical character recognition (OCR) is used by the classification model.

20. A computer program product comprising a non-transitory computer-readable medium having computer-executable instructions stored therein, wherein the computer-executable instructions, when executed by a computer, cause the computer to execute actions comprising:

sending, at a far edge, a sticker image of an object device to a near edge, wherein a sticker is attached to a surface of the object device, and the sticker image comprises an image of the sticker, wherein the sticker image is obtained at the far edge by utilizing a first machine learning model, deployed to the far edge from a cloud, to process one or more object images captured at the far edge, wherein at least one of the object images includes at least a portion of the sticker image, the near edge comprising at least one edge device that is arranged between a terminal device of the far edge and the cloud;

querying, at the far edge, label information of the object device based on a Radio Frequency Identification (RFID) label of the object device;

receiving, at the far edge from the near edge, a classification result from classifying the sticker image, wherein the classification result is obtained at the near edge by utilizing a second machine learning model, deployed to the near edge from the cloud, the second machine learning model being different than the first machine learning model;

comparing, at the far edge, the classification result with the label information; and sending, from the far edge, the sticker image to the cloud via the edge device of the near edge in response to determining that the classification result is not matched with the label information.

\* \* \* \* \*